United States Patent
Lefurgy et al.

(10) Patent No.: US 7,904,287 B2
(45) Date of Patent: Mar. 8, 2011

(54) METHOD AND SYSTEM FOR REAL-TIME PREDICTION OF POWER USAGE FOR A CHANGE TO ANOTHER PERFORMANCE STATE

(75) Inventors: Charles R. Lefurgy, Austin, TX (US); Madhu Saravana Sibi Govindan, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 622 days.

(21) Appl. No.: 11/938,834

(22) Filed: Nov. 13, 2007

(65) Prior Publication Data
US 2009/0125293 A1    May 14, 2009

(51) Int. Cl.
G06F 9/44        (2006.01)
G06F 13/10       (2006.01)
G06F 13/12       (2006.01)

(52) U.S. Cl. ........................................... 703/21
(58) Field of Classification Search ............... 703/21; 702/60, 180; 714/724
See application file for complete search history.

(56) References Cited

U.S. PATENT DOCUMENTS

| | | | | |
|---|---|---|---|---|
| 5,726,901 | A * | 3/1998 | Brown | 702/61 |
| 6,002,878 | A * | 12/1999 | Gehman et al. | 713/340 |
| 6,442,700 | B1 * | 8/2002 | Cooper | 713/320 |
| 6,513,124 | B1 | 1/2003 | Furuichi et al. | |
| 6,553,502 | B1 * | 4/2003 | Hurd et al. | 713/320 |
| 6,704,876 | B1 | 3/2004 | Iacobovici et al. | |
| 6,775,787 | B2 * | 8/2004 | Greene | 713/340 |
| 6,795,927 | B1 | 9/2004 | Altmedj et al. | |
| 6,795,928 | B2 | 9/2004 | Bradley et al. | |
| 6,816,809 | B2 | 11/2004 | Circenis | |
| 6,820,222 | B2 * | 11/2004 | Swoboda | 714/33 |
| 6,829,713 | B2 | 12/2004 | Cooper et al. | |
| 6,845,456 | B1 | 1/2005 | Menezes et al. | |
| 6,904,534 | B2 * | 6/2005 | Koenen | 713/323 |
| 7,017,060 | B2 | 3/2006 | Therien et al. | |
| 7,111,177 | B1 * | 9/2006 | Chauvel et al. | 713/300 |
| 7,272,517 | B1 * | 9/2007 | Brey et al. | 702/60 |
| 7,434,083 | B1 | 10/2008 | Wilson | |

(Continued)

OTHER PUBLICATIONS

Qing Wu, Qinru Qui, Massoud Pedram, Chih-Shun Ding, "Cycle-Accurate Macro-Models for RT-Level Power Analysis" IEEE Transactions on Very Large Scale Integration (VLSI) systems, vol. 6, No. 4, Dec. 1998, pp. 520-528.*

(Continued)

*Primary Examiner* — Dwin M Craig
(74) *Attorney, Agent, or Firm* — Mitch Harry, Atty at Law, LLC; Andrew M. Harris; Libby Z. Toub

(57) ABSTRACT

A method and system for real-time prediction of power usage for a change to another performance state provides input data for power management decision-making processes or for display to system operators. The unit(s) for which power usage is predicted may be a single processor in a uni-processor system or may extend up to the level of facilities within a complex of processing facilities. The method and system gather real-time data on the power consumption of the unit(s) and create a model, such as a regression model, of power versus performance. A resulting power usage change required by a prospective nominal performance state change is shown as display data, or is transmitted to a power budgeting controller to inform the controller as to potential changes that can enhance system operation, such as managing tradeoffs of power allocated to various sub-units of a processing system.

20 Claims, 5 Drawing Sheets

U.S. PATENT DOCUMENTS

| | | | |
|---|---|---|---|
| 7,607,030 B2 * | 10/2009 | Goodrum et al. | 713/300 |
| 2002/0194509 A1 | 12/2002 | Plante et al. | |
| 2002/0194517 A1 | 12/2002 | Cohen et al. | |
| 2003/0065960 A1 | 4/2003 | Rusu et al. | |
| 2003/0126479 A1 | 7/2003 | Burns et al. | |
| 2004/0041538 A1 | 3/2004 | Sklovsky | |
| 2004/0059956 A1 | 3/2004 | Chakravarthy et al. | |
| 2004/0225902 A1 | 11/2004 | Cesare et al. | |
| 2005/0049729 A1 * | 3/2005 | Culbert et al. | 700/50 |
| 2005/0060594 A1 | 3/2005 | Barr et al. | |
| 2005/0268189 A1 * | 12/2005 | Soltis | 714/724 |
| 2006/0129852 A1 | 6/2006 | Bonola et al. | |
| 2006/0156042 A1 | 7/2006 | Desai et al. | |
| 2006/0230299 A1 * | 10/2006 | Zaretsky et al. | 713/320 |
| 2006/0253715 A1 | 11/2006 | Ghiasi et al. | |
| 2006/0288241 A1 | 12/2006 | Felter et al. | |
| 2006/0294400 A1 | 12/2006 | Diefenbaugh et al. | |
| 2007/0016814 A1 | 1/2007 | Rusu et al. | |
| 2008/0141047 A1 | 6/2008 | Riviere-Cazaux | |

OTHER PUBLICATIONS

Wang, et al., "Managing Peak System-Level Power with Feedback Control", IBM Research Report RC23835, Dec. 2005.

Weiser, et al., "Scheduling for Reduced CPU Energy", "Proceedings of the First Symposium on Operating Systems Design and Implementation," Usenix Association Nov. 1994.

Bohrer, et al.: "The Case for Power Management in Web Servers", IBM Research, Austin TX, 2002.

U.S. Appl. No. 11/289,249, filed Nov. 29, 2005, Brey, et al.

U.S. Appl. No. 11/380,101, filed Apr. 25, 2006, Brey, et al.

U.S. Appl. No. 11/686,418, filed Mar. 15, 2007, Felter, et al.

* cited by examiner

METHOD AND SYSTEM FOR REAL-TIME PREDICTION OF POWER USAGE FOR A CHANGE TO ANOTHER PERFORMANCE STATE

BACKGROUND OF THE INVENTION

1. Technical Field

The present invention relates generally to power/performance measurement and management in processing systems, and more particularly, to a prediction scheme for predicting subsystem or processor power needs for a change to another nominal performance state.

2. Description of the Related Art

Power management in both large and small scale systems has become a necessity, for reason of both thermal management and power cost and power availability. In particular, very large scale systems may not be installed or fabricated with enough power availability or thermal handling capability to run all processors in the system at their maximum performance levels continuously. Nor is such use typically desirable. Server complexes, or even a particular server rack may exceed the available power if each processor is operated at full capacity, assuming sufficient cooling is available to maintain the system heat at an equilibrium level. The circuit from which the server system draws power may be limited, and further, the power delivered to an overall facility may be limited.

Therefore, power capping is frequently employed in such systems, and the individual power budgets of sub-systems down to the processor level are controlled by algorithms that determine the individual power budgets to meet the system thermal or available-power constraints. However, the information available to such systems typically includes only present-time power usage for the various processing sub-systems and estimated maps of performance levels versus power usage for specified workloads. Since workloads and environments such as temperature are typically dynamically changing in server systems and other variable-workload systems, a typical model of the impact of power budgets within a system or subsystem can generally only be accurate in a long-term average sense, and only then if the present workload is accurately reflected by the model.

With real-time power/performance control operating at high update rates in a processing system, the impact of a power budget that does not take into account the real-time workload and environmental changes is a loss in efficiency due to decisions that are not informed at a sufficient rate. For example, a particular sub-system might provide higher performance for the given workload if its power budget were increased slightly, but the power level cap for that sub-system does not permit a change in the nominal performance state and it is not apparent that the change would be slight. In converse, a sub-system may have a workload that is inefficiently using power and could dramatically change its power usage with only a small change in nominal performance state. While techniques such as dynamic voltage-frequency scaling (DVFS) and clock modulation can rapidly respond to power budget changes, e.g., changes in "capped" peak power, without information as to how the performance of each sub-system relates to the power usage for the sub-system, power management algorithms lack information on how changes in the power caps will affect system efficiency. Since changes in the power budgets cause controls such as DVFS and clock modulation to change the nominal operating points of the subsystems to meet the new power budgets, the dependency of performance on adjustment to the power budgets should be well-informed in order to optimize system efficiency in the allocation of the overall system power budget.

However, historical workload data is not typically sufficient to perform such real-time fine-tuning of power budgets, and while the input control to the individual subsystem is the performance state operating point, the limiting factor is generally the power cap. Therefore the nominal operating point is typically controlled only indirectly by the setting of power budgets. System operators setting power budget controls for sub-systems in such systems could note changes that could improve system efficiency in terms of performance state operating point, if accurate real-time information about how the power budget relates to the efficiency of individual sub-systems were available. Automatic power budgeting algorithms provide resultant power caps from an input (or fixed value) that is the overall power at the system partition level where power can be re-allocated among sub-systems.

Therefore, it would be desirable to provide a method and system for accurately predicting power usage changes for a change in nominal processor or sub-system performance state changes that operates at a rate sufficient to inform high update rate power budget control processes to improve the power usage efficiency for the overall system. It would further be desirable to provide display data to system operators that enable an enhanced view of power level changes required to cause particular performance state changes in individual sub-systems.

SUMMARY OF THE INVENTION

The objectives of accurately predicting power usage for a change to a particular performance state, and inform system operators of potential power usage changes for changes in nominal performance states of individual subsystems, is achieved in a method and system for predicting power usage for a particular sub-system nominal performance state.

The method and system predict the power usage that would be required in a particular nominal performance state for a sub-system (which may be a single processor) from a model based on real-time power consumption data for the sub-system. The particular nominal performance state may be a "full performance" state, so that the predicted power usage represents the "demand power", or how much power the sub-system could use if permitted to operate at maximum performance. The particular performance state can alternatively be a nominal value that represents the time-average of the multiple performance states that the subsystem experiences while responding to closed-loop power usage control. The method and system can also produce tabular or graphical output representing multiple nominal performance states and their corresponding power requirements to a system operator, and/or model coefficients or arrays of values provided to a system power management algorithm to inform a power budgeting process.

The power usage of a sub-system is measured and stored along with a time stamp and an indicator of the performance state of the sub-system at the sampling time. Samples older than a predetermined window of interest are discarded from the model, so that a real-time model of the present workload is obtained. If data for a particular performance state is not obtained within the window, the performance state for which data is needed may be temporarily forced, so that power usage data can be collected in that performance state. The model is generated from the distribution of the samples and may be a regression extended to the particular nominal performance state(s) for which the power usage prediction is/are desired.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention concerns a technique for determining the power that would be used by processor or subsystem, such as a server or server facility, if the nominal performance level of the processor or subsystem were adjusted to another level. In one application, the present invention determines the "demand power", i.e., that power that would be used by the processor or subsystem under current workload and environmental conditions if the performance of the processor or subsystem were set to the maximum level. In other embodiments, the present invention determines one or more power usage predictions for specified nominal performance levels other than the nominal performance level to which the processor or subsystem is set. "Nominal performance level" indicates that while the performance level of the processor or subsystem is generally dynamically changing, and therefore there is generally no specific performance level other than the maximum performance level that is "set" by controls, nevertheless there is a nominal (time-average) performance level that is set by mechanisms such as power usage capping that can be adjusted by adjusting the power usage cap to a higher or lower value. The performance levels are determined by controls such as processor voltage and frequency controls that determine both the throughput of individual processors and subsystems, and the power usage.

By gathering samples of the actual power consumption for multiple performance levels, a regression model is constructed that relates power usage to multiple performance levels of the processor or subsystem. The performance levels may be discrete control values or may represent ranges of performance controls, e.g., ranges of processor frequency/voltage control. The model may be further split into ranges of performance levels to take into account differences in control mechanisms, such as providing a range for the performance levels in which only the effective frequency of the processor or subsystem is varied for power control (such as when clock modulation techniques are employed at the minimum operating voltage of a processor) and another range for the performance levels in which both the frequency and voltage of the processor or subsystem is varied. Further, effective frequency is understood to encompass activity level as determined by other mechanisms such as controlling a rate of instruction fetches or memory accesses that are permitted for a processor or subsystem and any other technique by which the activity of the processor or subsystem can be constrained to reduce its power usage.

Figure 1:
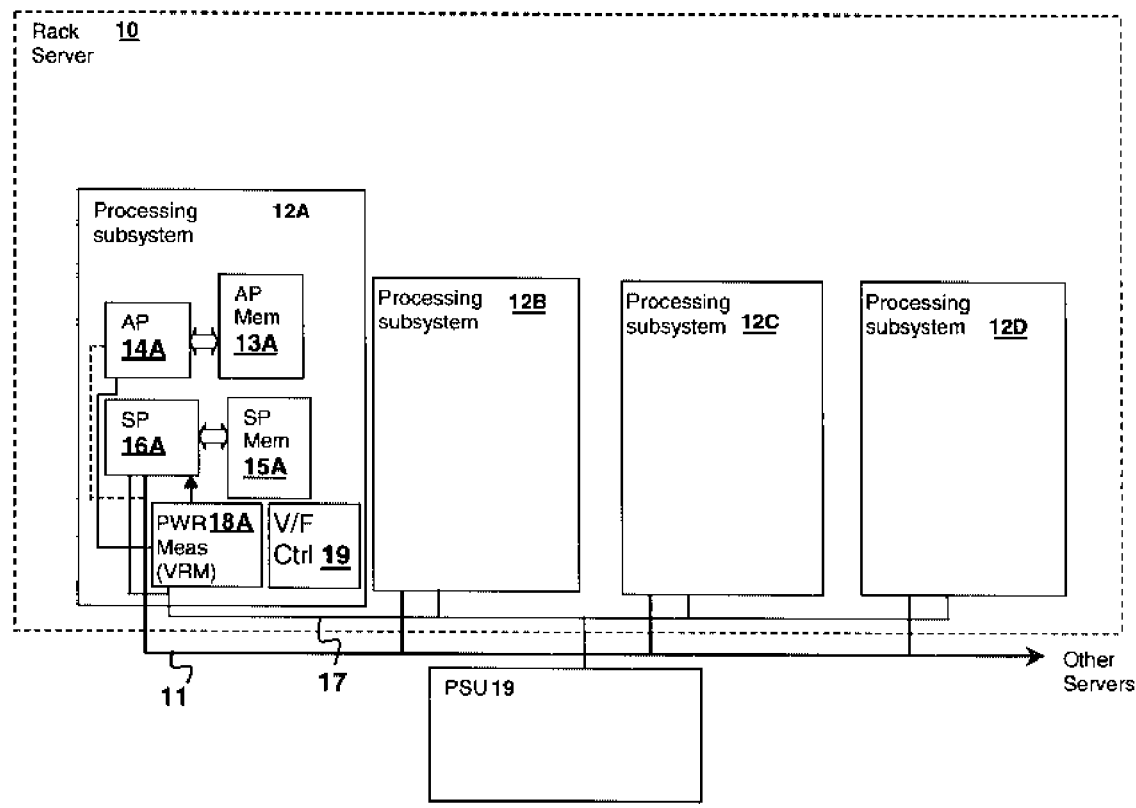
FIG. 1 is a block diagram of a multiple processing unit computing system in accordance with an embodiment of the invention.

Referring now to FIG. 1, a processing system is depicted in accordance with an embodiment of the present invention. Processing subsystems 12A-12D illustrate identical subunits of the overall system, rack server 10. Interconnection between processing subsystems 12A-12D is provided by a bus 11 that can also provide connection of the system to peripheral devices. Such connections and devices generally exist in processing systems and are understood in the art and can take on a variety of interconnect forms. The techniques of the present invention can also be applied in large-scale systems encompassing multiple rack servers 10 or other groups of computing systems.

Within processing subsystem 12A, an application processor (AP) 14A is coupled to an application memory (AP Mem) 13A, which generally represent the processor and storage per processing system or "blade" that run operating environments, virtual machines, server instances and/or other tasks associated with the primary functions of the computing system. Also within processing subsystem 12A (and similarly for the other identical processing subsystems 12B-12D), a service processor (SP) 16A provides control and monitoring functions for processing subsystem 12A including in the present embodiment, the collection of samples of actual power usage by processing subsystem 12A and control of performance level of processing subsystem 12A via voltage/frequency control unit 19.

Service processor 16A controls the frequency and core voltage of application processor 14A, can halt the processor 14A, change external clocks or re-program phase-lock loop (PLL) divider factors, and alter the power supply output voltages to change the power consumed by application processor 14A via voltage/frequency control unit 19, as well as by commands sent directly to internal circuits of application processor 14A. Service processor 16A is coupled to a service processor memory (SP Mem) 15A that stores service processor program instructions and data that collect and analyze the actual power usage data for multiple performance levels as set by voltage/frequency control unit 19 during real-time power managed operation. Generally, service processor 16A is provided with a budgetary power cap value that may change dynamically, via bus 11, from an executive power management program that manages the power usage of the entire rack server 10, which in turn may have an overall power cap provided from a power budget apportioned among servers for a given facility. A group of facilities may likewise be power managed by assigning caps to each facility.

A power supply unit (PSU) 19 provides power to processing subsystems 12A-12D through one or more power buses 17 and may comprise more than one power supply unit operating in tandem (e.g., separate PSUs for each of other identical processing subsystems 12B-12D) or may supply power to separate partitions of the system. A power measuring unit 18A is shown within processing subsystem 12A, and is also present in other subsystems 12B-12D. Power measuring unit may be incorporated within a voltage regulator module (VRM) that provides for voltage regulation in addition to current measurement, and in particular, voltage control in response to a digital signal that selects the processor voltage as part of the power management schemes described herein. Power measuring unit 18A is configured to measure the power supplied to application processor 14A, so that samples of actual power consumption by application processor 14A may be collected. However, the power measurement may alternatively include the entire processing subsystem 12A if the power consumption of service processor 16A and service processor memory 15A is negligible or constant, and the power consumed by AP memory 13A is either negligible or tracks the variation in power consumed by application processor 14A. While the figure provides a concrete example of an architecture that implements the above-described power usage measurement and performance control, the depicted architecture should not be construed as limiting. For example, the power usage of a uni-processor system may also be measured and the power usage level controlled via performance level management, just as each subsystem (e.g., processor, memory and I/O subsystems) is independently monitored in the depicted embodiment. A VRM such as one incorporated within power measurement unit 18A receives commands from service processors, such as service processor 16A, to adjust the voltage supplied to application processors, such as application processor 14A, in conformity with a selected operating frequency for the processor.

In the embodiment of the present invention depicted in FIG. 1, power usage is predicted for one or more nominal performance levels other than the present-time nominal performance level. As mentioned above, the performance level for which the power usage is predicted may be the maximum performance level (i.e., maximum processor frequency and voltage), so that the demand power level is predicted. For the above purpose, service processor memory 15A contains program instructions for execution by service processor 16A that collect samples of actual power usage in processor subsystem 12A from power measurement unit 18A and construct a regression model from which power usage for the present environmental conditions and workload is computed for the one or more other nominal performance levels. The resulting predicted power usage value(s) may be displayed, and/or provided to the power management executive program(s) so that budgetary power levels can be adjusted to take into account the relationship between actual power usage and nominal performance levels, when setting power budgets that ultimately determine the actual nominal performance levels set for each subsystem or processor such as processing subsystems 12A-12D.

Figure 2:
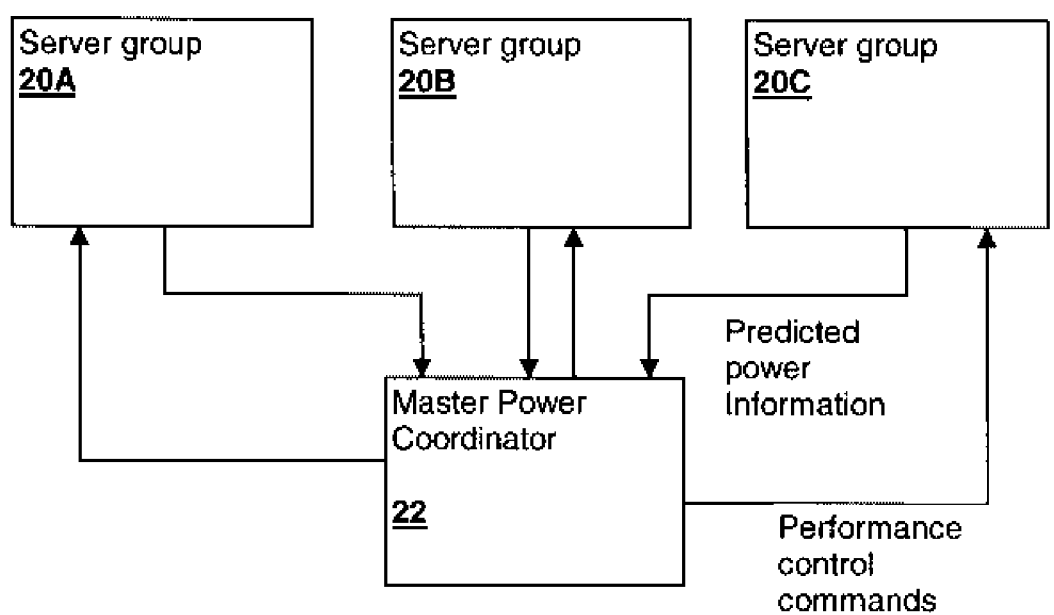
FIG. 2 is a block diagram of a multiple facility computing system in accordance with an embodiment of the invention.

Referring now to FIG. 2, a larger-scale processing system is depicted in accordance with an embodiment of the present invention. Multiple server groups 20A-20C, each of which may comprise multiple units such as rack server 10 of FIG. 1 are coupled to a master power coordinator 22, which is generally an executive program residing as a process within the overall system of FIG. 2, and may be executed on one or more of application processors 14A. Predicted power usage information for each of server groups 20A-20C is provided to master power coordinator, and performance control commands are set back to performance determining units within server groups 20A-20C, such as voltage/frequency control units 19. In general, the performance control commands from higher levels will be in the form of budgetary power caps, rather than actual performance control values, and the actual performance control determinations will be performed by lower-level decision makers such as service processors 16A that set performance levels based upon the power budgets apportioned to the corresponding sub-system or processor. However, in the alternative, or at any level higher than the lowest-level control point, performance levels can be determined by an algorithm for each of multiple lowest-level units, and performance control commands sent through communication mechanisms down to the performance-controlling units such as service processors 16A or directly to voltage/frequency control units 19.

Figure 3:
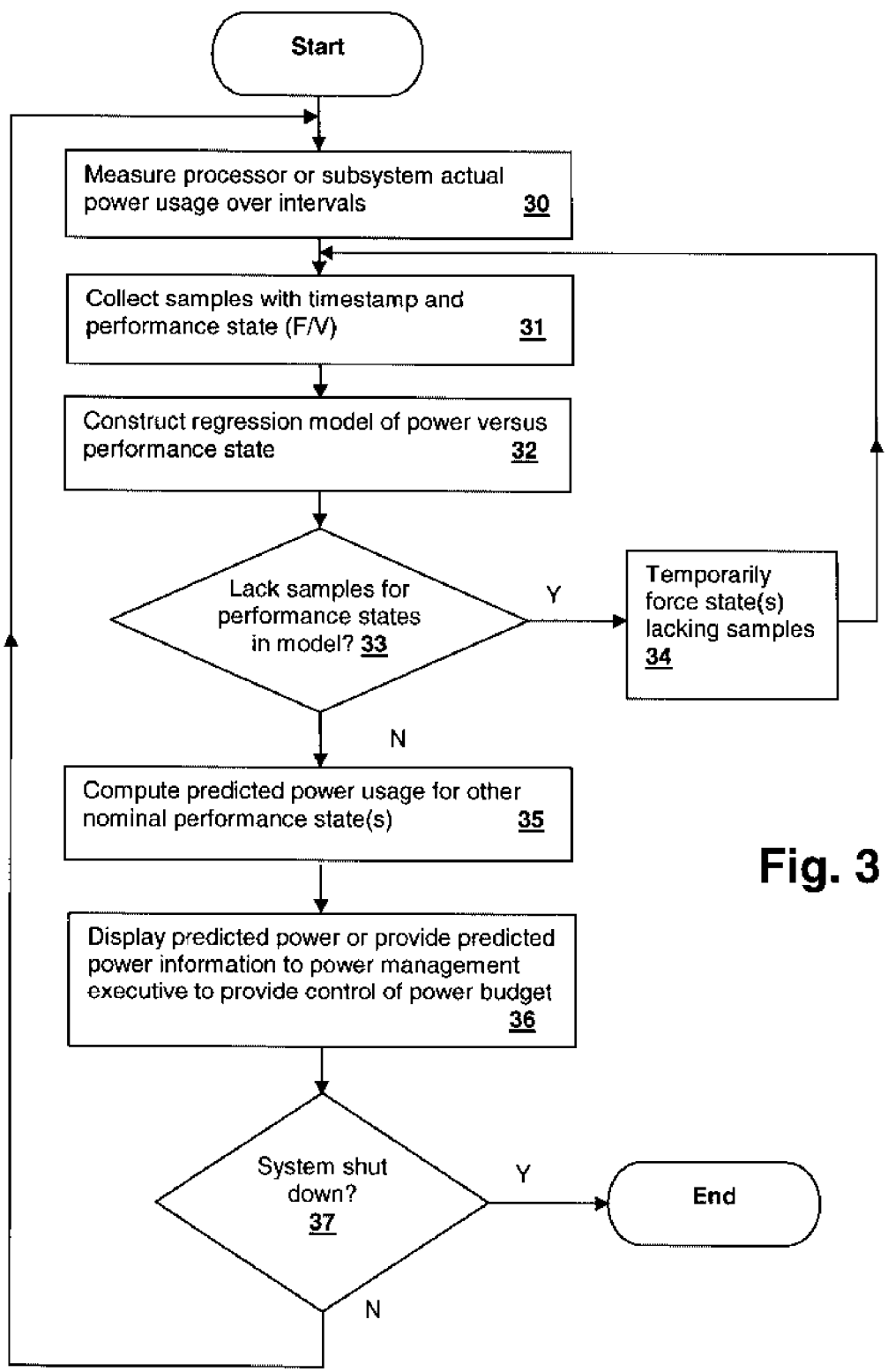
FIG. 3 is a flowchart depicting a method in accordance with an embodiment of the present invention.

Referring now to FIG. 3, a method in accordance with an embodiment of the present invention is shown. Actual power usage of a processor or sub-system measured over intervals (step 30) and the power usage values are collected along with time stamp and performance state (e.g., processor frequency and voltage) information (step 31). A regression model of power usage versus performance state is constructed, as the performance state varies under power management control (step 32). If samples are lacking for a particular performance state (decision 33), the states for which samples are lacking may be temporarily forced (step 34), samples collected at the forced performance states (step 31) and the model updated (step 32). Then, the power usage for one or more other nominal performance states is computed (step 35) and the result is displayed for system operator use and/or provided to a power management executive for making power budget decisions (step 36). Until the system (or measurement process) is shut down (decision 37), steps 30-36 are repeated.

Figure 4:
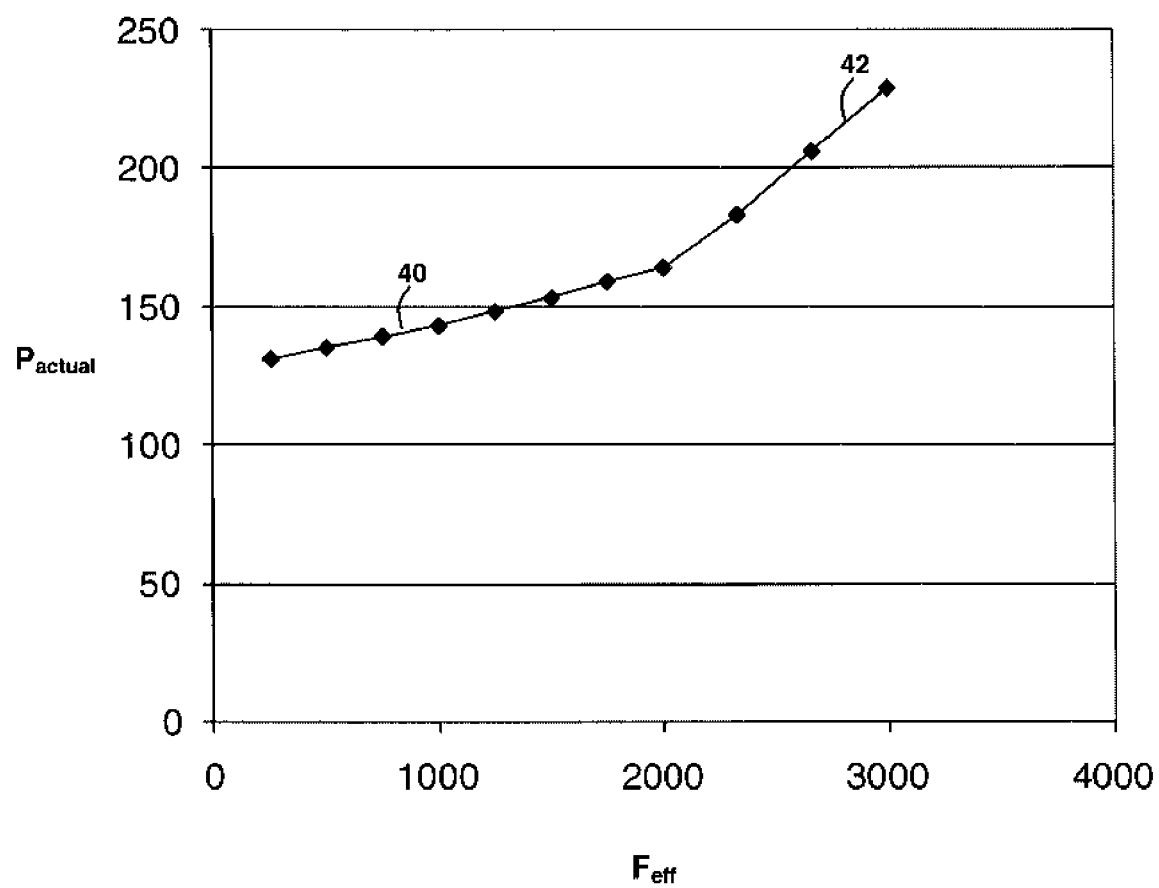
FIG. 4 is a graph depicting a regression model used in a method and system in accordance with an embodiment of the invention.

Referring now to FIG. 4, a regression model in accordance with an embodiment of the present invention is shown in a graph. Lines are fit to curves 40 and 42 according to a least-squares linear regression that represents the data of actual power usage versus performance level, which is shown in the graph as power vs. effective processor frequency. In the range of performance levels within curve 40, the effective processor frequency is controlled by modulating the processor clock (e.g., skipping clock cycles) while operating the processor at minimum power supply voltage. In the range of performance levels within curve 42, the effective processor frequency is controlled by varying the actual processor clock frequency and the core power supply voltage by dynamic frequency-voltage scaling (DFVS). Using a two range approximation to curves 40 and 42, provides a more accurate model than alternatives such as a polynomial fitting approach, which might provide inaccurate results in the region near the intersection/cross-over of curves 40 and 42. The position and shape of curves 40 and 42 is dynamically changing with workload and environmental conditions such as temperature, and therefore, the data displayed in curves 40 and 42 is obtained by discarding samples older than a predetermined window function. The samples are also filtered for noise, so that the points displayed on curves 40 and 42 represent ranges of nominal performance values. In order to obtain the power usage for a particular nominal performance value, the lines fit to curves 40 or 42 can be used to extrapolate the predicted power usage for the particular nominal performance value that is specified.

Figure 5:
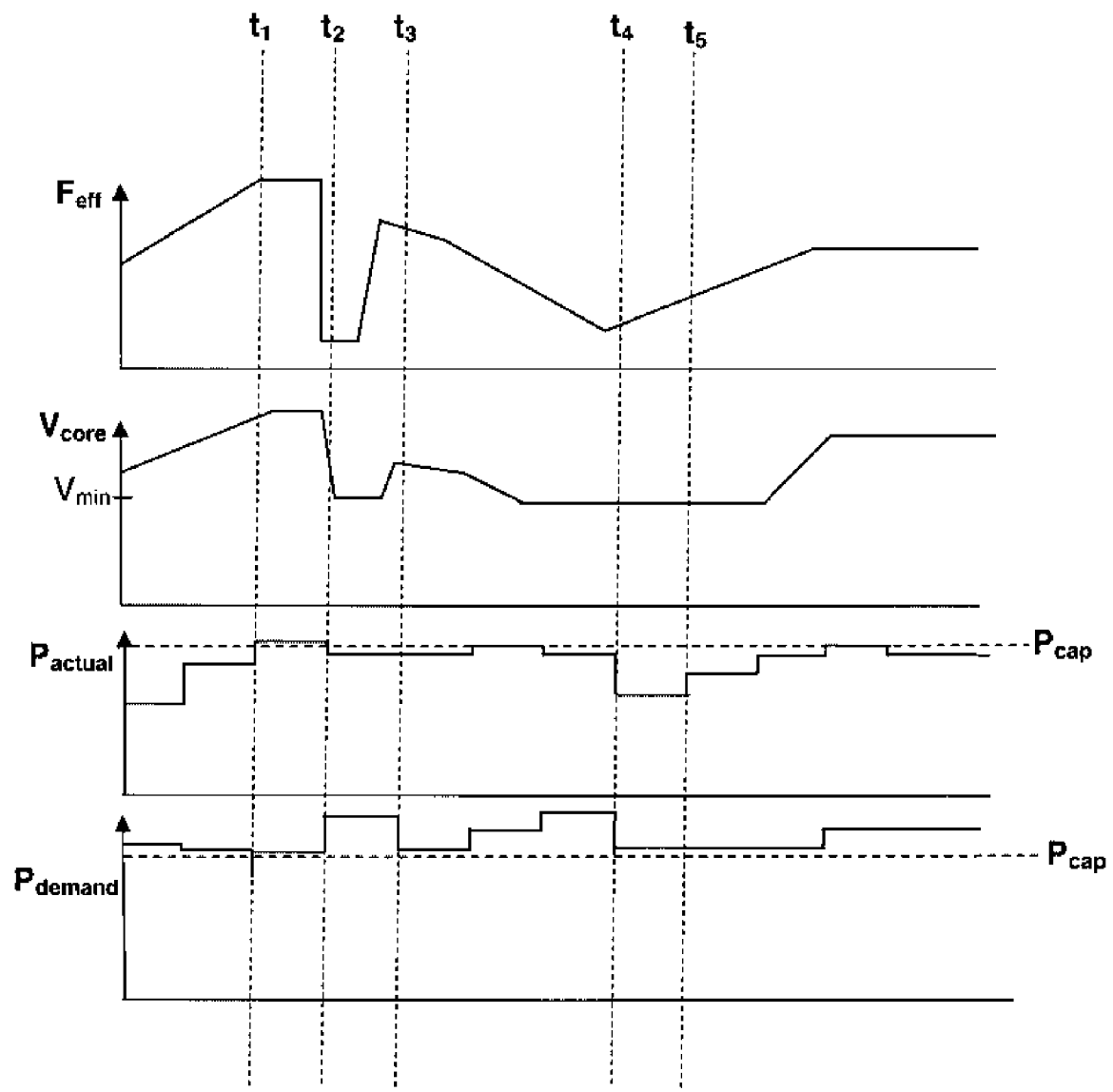
FIG. 5 is a graph depicting power and performance levels as analyzed and modeled by embodiments of the present invention.

FIG. 5 is a graph illustrating real time values that provide input to and illustrate the techniques described above. The effective frequency $F_{eff}$ of a processor or subsystem is shown over several sampling periods alongside a processor core voltage $V_{core}$. While processor core voltage may have multiple values corresponding to difference devices (e.g., processors) within a subsystem, for illustrative purposes, it is assumed that all effective operating frequencies and core voltages are the same for each device within the subsystem. However, a model such as that illustrated in FIG. 4 may be constructed for each processor within a sub-system and combined, or a nominal performance level that combines (e.g., averages) the overall performance levels of each processor within a subsystem can be expressed as the "effective frequency" of the subsystem. During the period from $t_1$ to $t_2$ the illustrated processor or subsystem is operating at a maximum performance level. During the period from $t_2$ to $t_3$ the performance level has been constrained due to power budget requirements and workload power usage increase, and from period from $t_3$ to $t_4$ performance is still constrained, and due to increasing workload requirements, the performance level is continuously reduced. From period from $t_4$ to $t_5$ the actual power usage of the workload has relaxed to the point that the performance level of the processor or subsystem can rise without exceeding the power budget. Actual power usage $P_{actual}$ over each interval as collected by the present invention is shown in the graph, along with the demand power $P_{demand}$ which varies for each interval. During the period from $t_1$ to $t_2$ demand power $P_{demand}$ is substantially equal to actual power usage $P_{actual}$, since the processor or subsystem is operating a maximum performance. Also during the period from $t_1$ to $t_2$, budgetary power value $P_{cap}$ was exceeded causing a rapid ramp-down in processor or subsystem frequency and voltage. For all other intervals, demand power $P_{demand}$ is greater than actual power usage $P_{actual}$, representing the power that would be used by the processor or subsystem if the power budget were increased to a level at or above demand power $P_{demand}$ so that the processor or subsystem would be operated at its maximum performance level. Specified performance levels other than the maximum performance for which power usage predictions are desired will result in graphs having lower predicted power values than the demand power $P_{demand}$ graph, but will generally follow the same trend, as the demand power graph reflects the level to which a workload can use available power.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A computer-performed method of predicting power usage of a processor or sub-system for a particular nominal performance state that differs from a present nominal performance state for the processor or sub-system, the method comprising:
    collecting samples of actual power usage over a plurality of measurement intervals for a plurality of controlled performance states of the processor or sub-system while executing a current workload;
    constructing a real-time model relating power usage of the processor or subsystem to the controlled performance states from the collected samples, according to a moving window that removes an effect of older samples from the model;
    computing, from the model, at least one power usage value representing the predicted power usage of the processor or subsystem if the processor or subsystem were set to operate at the particular nominal performance state while executing the current workload; and
    performing at least one of displaying results of the computing or controlling a power budget for the processor or subsystem in conformity with a result of the computing.

2. The computer-performed method of claim 1, wherein the constructing a real-time model comprises computing a regression of the actual power consumption for the controlled performance states, using a set of samples collected most recently for each of the controlled performance states included in the model.

3. The computer-performed method of claim 2, wherein the plurality of controlled performance states include performance states corresponding to a clock modulation region of operation of the processor or subsystem and a voltage-frequency scaling region of operation of the processor or subsystem, and wherein a separate regression curve is used in the model for each of the clock modulation region and the voltage-frequency scaling region.

4. The computer-performed method of claim 1, further comprising:
    determining whether or not a sufficient number of samples for a particular one of the controlled performance states is available within a set of the collected samples; and
    responsive to determining that a sufficient number of samples is not available, temporarily forcing the processor or subsystem to operate in the particular one of the controlled performance states, wherein the collecting collects samples for the particular controlled performance state in response to the forcing.

5. The computer-performed method of claim 1, wherein the particular nominal performance state is a maximum performance operating state of the processor or subsystem, whereby the computing computes the demand power of the processor or subsystem.

6. The computer-performed method of claim 1, wherein the computing is repeated to compute power usage values representing the predicted power usage for multiple specified nominal performance states and wherein the displaying displays the multiple computed power usage values or the controlling uses the multiple computed power usage values to control the power budget.

7. The computer-performed method of claim 1, wherein the multiple controlled performance states comprise ranges of effective frequency of operation of the processor or subsystem, and wherein the samples represent an average power consumption of the processor or subsystem over the corresponding interval and over the range of effective frequency of operation during the corresponding interval.

8. A computer system comprising a first processor for executing program instructions coupled to a memory for storing the program instructions and data, wherein the program instructions predict power usage of a second processor or sub-system for a particular nominal performance state that differs from a present nominal performance state of the second processor or sub-system, wherein the program instructions further comprise program instructions for:
    reading samples of actual power usage over a plurality of measurement intervals for a plurality of controlled performance states of the processor or sub-system while executing a current workload;
    constructing a real-time model relating power usage of the second processor or subsystem to the controlled performance states from the collected samples, according to a moving window that removes an effect of older samples from the model;
    computing, from the model, at least one power usage value representing the predicted power usage of the second processor or subsystem if the second processor or subsystem were set to operate at the particular nominal performance state while executing the current workload; and
    performing at least one of displaying results of the computing or controlling a power budget for the second processor or subsystem in conformity with a result of the computing.

9. The computer system of claim 8, wherein the second processor or subsystem is the first processor, wherein the first processor by executing the program instructions, computes its predicted power usage for the particular nominal performance state.

10. The computer system of claim 8, wherein the first processor is a service processor coupled to a power measurement unit for measuring the actual power usage of the second processor or subsystem, wherein the service processor is further coupled to a performance control unit for controlling the performance states of the second processor or subsystem, whereby the service processor computes predicted power usage for the particular nominal performance state of the second processor or subsystem by executing the program instructions.

11. The computer system of claim 8, wherein the program instructions for constructing a real-time model comprise program instructions for computing a regression of the actual power consumption for the controlled performance states, using a set of samples collected most recently for each of the controlled performance states included in the model.

12. The computer system of claim 11, wherein the plurality of controlled performance states include performance states corresponding to a clock modulation region of operation of the second processor or subsystem and a voltage-frequency scaling region of operation of the second processor or subsystem, and wherein a separate regression curve is used in the model for each of the clock modulation region and the voltage-frequency scaling region.

13. The computer system of claim 8, further comprising program instructions for:
    determining whether or not a sufficient number of samples for a particular one of the controlled performance states is available within a set of the collected samples; and
    responsive to determining that a sufficient number of samples is not available, temporarily forcing the second processor or subsystem to operate in the particular one of the controlled performance states, wherein the program instructions for reading read samples for the particular controlled performance state collected in response to the forcing.

14. The computer system of claim 8, wherein the particular nominal performance state is a maximum performance operating state of the second processor or subsystem, whereby the computing computes the demand power of the second processor or subsystem.

15. The computer system claim 8, further comprising program instructions for repeating execution of the program instructions for computing to compute power usage values representing the predicted power usage for multiple specified nominal performance states and wherein the displaying displays the multiple computed power usage values or the controlling uses the multiple computed power usage values to control the power budget.

16. The computer system of claim 8, wherein the multiple controlled performance states comprise ranges of effective frequency of operation of the second processor or subsystem, and wherein the samples represent an average power consumption of the second processor or subsystem over the corresponding interval and over the range of effective frequency of operation during the corresponding interval.

17. A computer program product comprising computer-readable storage media containing program instructions for execution by a computer system, wherein the program instructions predict power usage of a processor or sub-system for a particular nominal performance state that differs from a present nominal performance state of the processor or sub-system, wherein the program instructions further comprise program instructions for:
    reading samples of actual power usage over a plurality of measurement intervals for a plurality of controlled performance states of the processor or sub-system while executing a current workload;
    constructing a real-time model relating power usage of the processor or subsystem to the controlled performance states from the collected samples, according to a moving window that removes an effect of older samples from the model;
    computing, from the model, at least one power usage value representing the predicted power usage of the processor or subsystem if the processor or subsystem were set to operate at the particular nominal performance state while executing the current workload; and
    performing at least one of displaying results of the computing or controlling a power budget for the processor or subsystem in conformity with a result of the computing.

18. The computer program product of claim 17, wherein the program instructions for constructing a real-time model comprise program instructions for computing a regression of the actual power consumption for the controlled performance states, using a set of samples collected most recently for each of the controlled performance states included in the model.

19. The computer program product of claim 18, wherein the plurality of controlled performance states include performance states corresponding to a clock modulation region of operation of the processor or subsystem and a voltage-frequency scaling region of operation of the processor or subsystem, and wherein a separate regression curve is used in the model for each of the clock modulation region and the voltage-frequency scaling region.

20. The computer program product of claim 18, wherein the program instructions further comprise program instructions for:
    determining whether or not a sufficient number of samples for a particular one of the controlled performance states is available within a set of the collected samples; and
    responsive to determining that a sufficient number of samples is not available, temporarily forcing the processor or subsystem to operate in the particular one of the controlled performance states, wherein the program instructions for reading read samples for the particular controlled performance state in response to the forcing.

* * * * *